United States Patent [19]
Giles

[11] Patent Number: 5,957,350
[45] Date of Patent: Sep. 28, 1999

[54] KAYAK LOADING DEVICE EMPLOYING GUIDING ROLLERS AND ROOF RACK ATTACHMENT MECHANISM

[76] Inventor: Steven E. Giles, 146 Montauk Hwy., Apt. 16, Westhampton, N.Y. 11977

[21] Appl. No.: 08/880,380

[22] Filed: Jun. 23, 1997

[51] Int. Cl.⁶ .................................................. B60R 9/042
[52] U.S. Cl. ............................................ 224/310; 414/462
[58] Field of Search ............................ 414/462; 224/310, 224/319

[56] References Cited

U.S. PATENT DOCUMENTS

| | | | |
|---|---|---|---|
| 2,247,128 | 6/1941 | Levy | 224/310 |
| 2,325,762 | 8/1943 | Ford | 224/310 |
| 2,464,979 | 3/1949 | Hyatt | 224/310 |
| 2,469,945 | 5/1949 | Brei | 224/310 |
| 2,469,987 | 5/1949 | Pilsner | 224/310 |
| 2,624,497 | 1/1953 | Newman | 224/310 |
| 2,885,102 | 5/1959 | Duncan | 224/310 |
| 3,064,841 | 11/1962 | Ellingson | 224/310 |
| 3,170,583 | 2/1965 | Meyer | 224/310 |
| 3,712,524 | 1/1973 | Ames, Sr. | 224/310 |
| 3,819,074 | 6/1974 | Oliver | 224/310 |
| 3,999,673 | 12/1976 | Anderson | 224/310 |
| 4,024,971 | 5/1977 | Rohrer | 224/310 |
| 4,531,879 | 7/1985 | Horowitz | 224/310 |
| 4,830,249 | 5/1989 | Mirenda et al. | 224/310 |
| 4,907,934 | 3/1990 | Holladay | 224/310 |
| 5,775,557 | 7/1998 | Arvidsson | 224/310 |

*Primary Examiner*—Linda J. Sholl

[57] ABSTRACT

A device allowing one person to easily and conveniently load a kayak or similar article onto an automobile's roof rack. The device comprises several freely rotating rollers oriented in a "V" configuration by rigid struts attached to a crossmember. Padded feet flexibly mounted to vertical stanchions extending downward from the crossmember support the rear most portion of the loading device. An attachment mechanism extends forward from the crossmember which securly latches the loading device onto a vehicle's roof rack crossbar. Loading a kayak requires first positioning a kayak's bow into the vertex of the rollers. The stern of the kayak is then pushed upwardly and forwardly along the rollers onto the automobile's roof rack. The device is removed from the automobile's roof rack after the kayak is loaded.

4 Claims, 10 Drawing Sheets

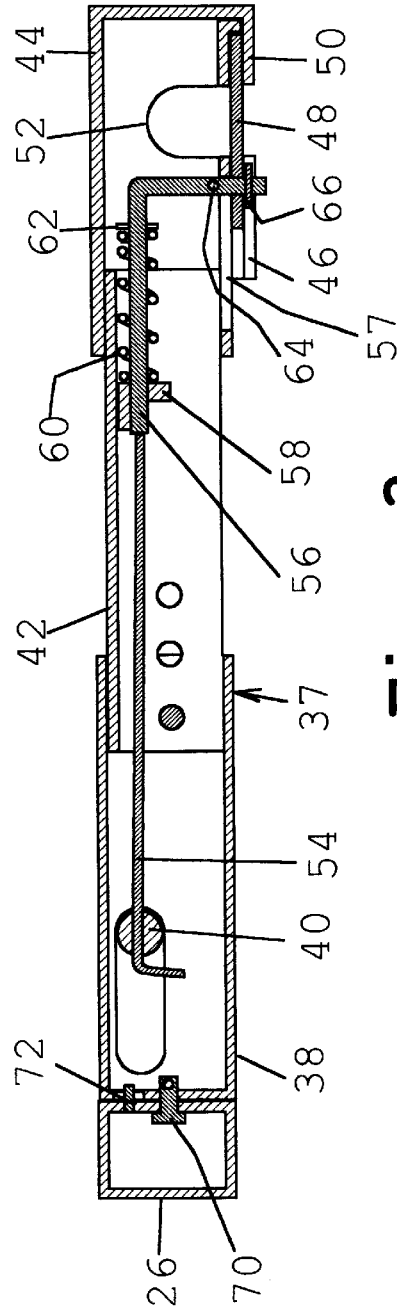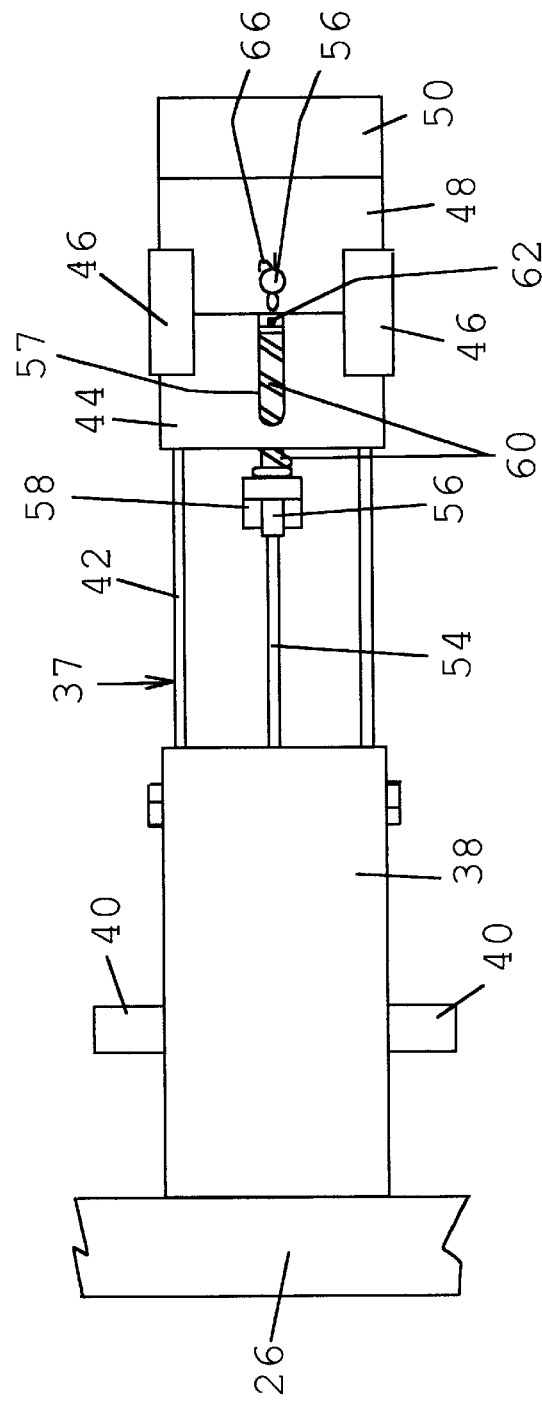

KAYAK LOADING DEVICE EMPLOYING GUIDING ROLLERS AND ROOF RACK ATTACHMENT MECHANISM

BACKGROUND

1. Field of Invention

This invention relates to loading kayaks and similar articles onto an automobile's roof rack, specifically to permit one person to easily and quickly load a kayak or similar article onto an automobile's roof rack.

2. Description of Prior Art

The roof top transportation of kayaks by automobile differs from that of transporting open hulled boats such as small row boats and canoes. A kayak's hull design is typically long and narrow with extreme variations in the hull cross sectional profile. The hull cross section ranges from a shallow "V" and tapers to an extremely deep "V" at either end of the craft. In addition a kayak hull is enclosed by a water tight deck extending to the bow and stern from the central cockpit.

Open hulled boats are usually inverted and loaded onto a motor vehicle's roof rack with the gunwales resting on the roof rack crossbars. The preferred method of securing a kayak to a motor vehicle's roof rack is to strap the kayak, in an upright position, onto cradles mounted on the roof rack crossbars. The cradle's surfaces closely match the cross sectional profile of the kayak's hull. In addition, the cradle's surface contacting the kayak's hull is lined with a pliable material that grips the kayak's hull. This provides a very stable means of securing a kayak for roof top transportation by motor vehicle.

Safely lifting a kayak high enough to place it onto the roof rack cradles of an average automobile such as a sedan is a simple task for two people. One person can perform this task if they are physically capable of managing a cumbersome kayak to load it onto their motor vehicle's roof rack cradles. Loading a kayak onto the roof rack cradles of a high profile motor vehicle such as a van, mini-van and sport utility vehicle presents a problem however. Even though most kayaks are lightweight, one person cannot safely lift a kayak high enough to maneuver it onto the roof rack cradles of a high profile vehicle.

Many devices have been developed to aid a single person to load boats, canoes and other cumbersome articles onto a motor vehicle's roof rack. However, none meet the special requirements of loading kayaks.

U.S. Pat. No. 2,464,979 to Hyatt (1949) and U.S. Pat. No. 2,885,102 to Duncan (1959) both show devices featuring one or several coaxially mounted rollers supported by a frame fixed to the rear bumper of a motor vehicle. Loading a boat requires inverting the boat and then placing the bow of the boat on a roller or rollers. The boat is then pushed upwards onto the motor vehicle's roof rack. A disadvantage of both these inventions is the boat's gunwales remain on a roller or rollers while the boat is being transported. A second disadvantage is both inventions will not easily accept cradles. Strapping a kayak directly to a roller or rollers will damage a kayak's hull. A third disadvantage of these inventions is an individual must actively guide and maintain a kayak in an upright position while pushing it up onto the vehicle. A kayak will easily roll to one side and translate along a roller or rollers while being loaded. A fourth disavantage is that both devices do not install easily requiring tightening several straps and clamps.

U.S. Pat. No. 2,469,945 to Brei (1949), U.S. Pat. No. 2,469,987 to Pilsner (1949), U.S. Pat. No. 2,624,497 to Newman (1953) and U.S. Pat. No. 3,064,841 to Ellingson (1962) all describe automotive roof racks incorporating a roller or coaxially mounted rollers on the rear or both front and rear roof rack crossbars. Loading a boat requires inverting the boat and placing the bow of the boat on a roller or rollers. The boat is then pushed up onto the vehicle's roof. The Brei, Pilsner and Ellingson inventions permit the roller or rollers to be moved away from a boat's gunwales during transportation, although, with additional effort by the person loading the boat. The Newman device mechanically raises a boat's gunwales upwards from the rollers for transportation. Newman's invention does provide a simpler method of removing a boat from contact with the rollers than the Brei, Pilsner and Ellingson inventions. However, Newman's invention is mechanically more complex and still requires additional time and effort to lift a boat from the rollers. A disadvantage of the Brei, Pilsner, Ellingson and Newman inventions is they will provide little assistance guiding a kayak and maintaining it in an upright position during loading. Another disadvantage of these devices is that they will not function well with cradles.

U.S. Pat. No. 2,325,762 to Ford (1943) describes a boat loading attachment for automotive roof racks. The device incorporates two coaxially mounted rollers and a method of attachment which permits temporary installation of the device. Ford's invention also requires inverting a boat and loading it on its gunwales. A major disadvantage of Ford's invention is no provision for guiding a boat as it is loaded. A boat could easily slip off the rollers as it is being loaded. A second disadvantage of Ford's invention is the attachment of the device to a roof rack crossbar. The method is time consuming and the device could easily detach if the clamps are not tightened sufficiently.

U.S. Pat. No. 3,819,074 to Oliver (1974) shows another loading device incorporating coaxially arranged rollers, a winch, rope, pulleys and a complex framework. This device would not be suitable for loading a kayak since the method will damage a kayak's hull as it is winched up and over the rear most roller. Another disadvantage of Oliver's invention is the complexity and cost of such a device.

U.S. Pat. No. 3,999,673 to Anderson (1976), U.S. Pat. No. 4,024,971 to Rohrer (1977) and U.S. Pat. No. 4,907,934 to Holladay (1990) all show very complex winching arrangements for loading boats onto high profile vehicles. These inventions also require additional hardware or linkage mounted to the boat prior to using the device. These inventions are far too costly and complex for loading lightweight articles such as kayaks.

U.S. Pat. No. 2,247,128 to Levey (1941), U.S. Pat. No. 3,170,538 to Meyer (1965) and U.S. Pat. No. 4,531,879 to Horowitz (1985) describe inventions allowing one person to load a boat onto the roof of an automobile in a upright position. The Levey invention simply consists of a series of stepped rollers mounted to a supporting frame. The boat is pushed up onto the automobile's roof. The Meyer and Horowitz inventions incorporate rollers mounted on complex tilting frames. Both Meyer and Horowitz require winches and rope to pull the boat up onto the vehicle's roof. Again, these inventions are far too complex for loading kayaks. In addition, the boat remains on rollers during transportation.

U.S. Pat. No. 3,712,524 to Ames, Sr. (1973) describes a roller mounted to a motor vehicle's deck lid. Again, the invention will not maintain a kayak in an upright position during loading. Another disadvantage is the time and effort required to strap the device to a motor vehicle's deck lid.

OBJECTS AND ADVANTAGES

It is therefore an object of the present invention to allow an individual to safely load a kayak or similar article onto the roof rack of their vehicle with little physical effort and without the assistance of a second person.

It is another object to permit installation and removal of the invention with minimal expenditure of time and physical effort by the person loading a kayak.

It is another object to easily employ the invention in conjunction with cradles attached to a conventional roof rack.

It is another object to provide a plurality of freely rotating rollers configured in such a manner as to guide and maintain a kayak in an upright position as it is being loaded. It is yet another object to provide a secure means of attaching the invention to a vehicle's roof without the need of installing additional components or hardware on the vehicle or roof rack crossbar.

It is a further object of the invention to load a kayak without the need to mount or attach additional components or hardware to a kayak.

Still further objects and advantages will become apparent from a consideration of the ensuing description and accompanying drawings.

BRIEF DESCRIPTION OF THE DRAWINGS

FIG. 3 is a sectional view along the plane 3—3 showing in detail components of the attachment mechanism. The roller, roller support, roller strut, padded foot and stanchion are not shown.

FIG. 4 is a view along the plane 4—4 showing a bottom view of the attachment mechanism.

Figure 1:
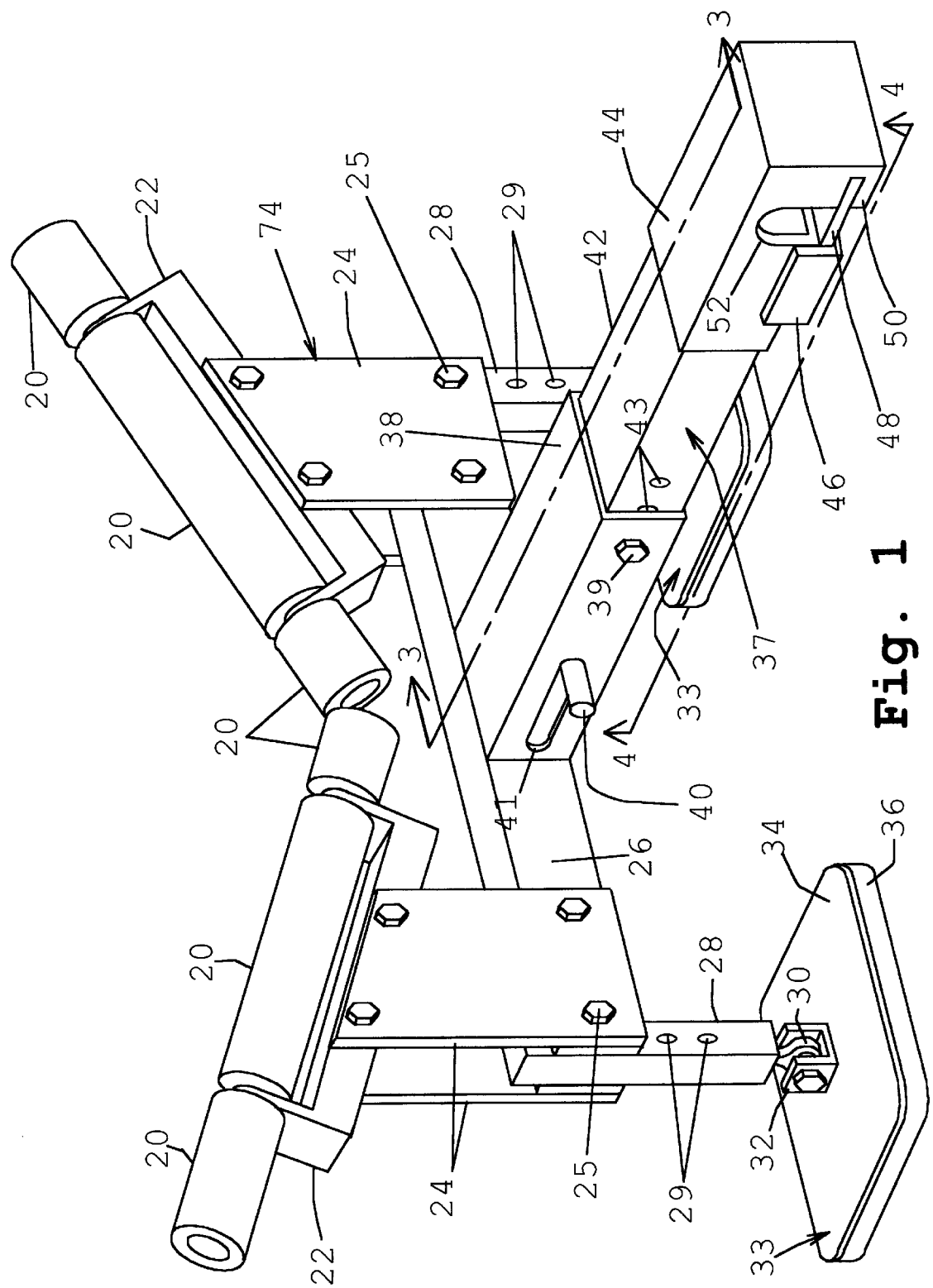
FIG. 1 is a front perspective view of the loading device.

REFERENCE NUMERALS 20 rollers
22 roller support
24 roller strut
25 through bolt
26 crossmember
28 stanchion
29 through holes
30 rod end
32 transition bracket
33 padded foot
34 ridgid backing
36 resilient pad
37 attachment mechanism
38 extension socket
40 latch release handle
41 latch release handle slot
42 length adjusting section
44 latch housing
46 latch plate guide
48 latch plate
50 forward latch support
52 crossbar relief
54 cable
56 latch plate actuating rod
57 latch plate actuating rod slot
58 latch plate actuating rod guide
60 compression spring
62 pin
64 thrust pin
66 cotter pin
70 pivot pin
72 limit pin
74 loading device
76 vehicle
77 vehicle roof panel
78 rear roof rack crossbar support
80 rear roof rack crossbar
82 rear cradles
84 kayak
86 front cradles
88 front roof rack crossbar
90 front roof rack crossbar support
92 rear strap
94 front strap

SUMMARY

Accordingly, the objective of the present invention is to provide a simple loading device comprising freely rotating rollers, an attaching mechanism and padded feet that will allow a person to load a kayak onto the roof rack cradles of a vehicle.

PREFERRED EMBODIMENT—DESCRIPTION

Figure 2:
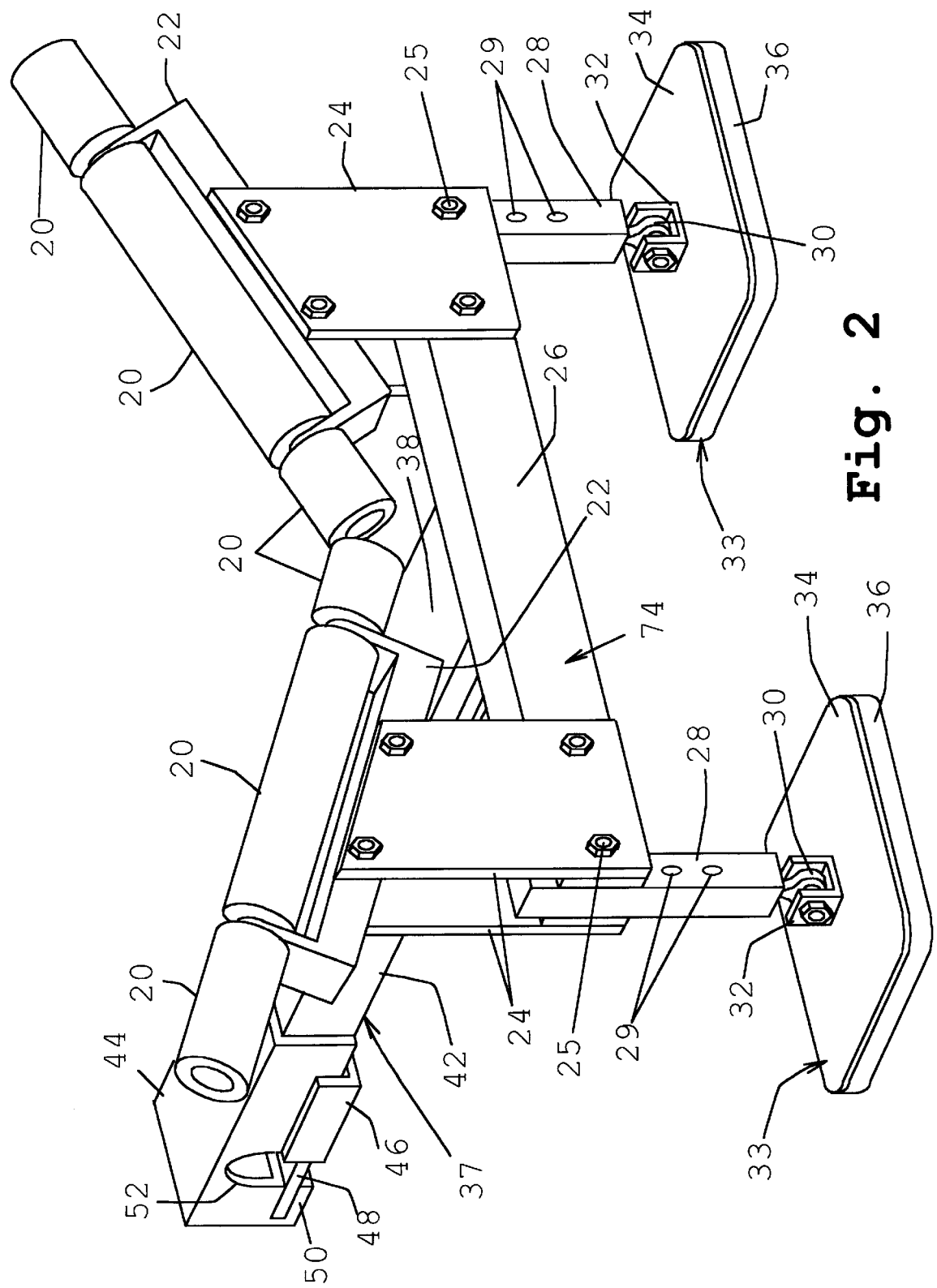
FIG. 2 is a rear perspective view of the loading device.

Refering to FIGS. 1 & 2, front and rear perspective views of the loading device 74 respectively. Freely rotating rollers 20 are mounted in a roller support 22. A pair of roller struts 24 extending downward from roller supports 22 attaches to a crossmember 26. Roller struts 24 serve both to suspend roller supports 22 and rollers 20 above crossmember 26 and to fix rollers 20 in a "V" configuration.

A stanchion 28 extends downward from each end of crossmember 26. Several through holes 29 evenly spaced along the centerline of stanchions 28 permit height adjustment of rollers 20. Height adjustment is accomplished by removing a through bolt 25 and sliding stanchion 28 vertically to a through hole 29 corresponding to the desired height of rollers 20. Through bolt 25 is inserted and tightened to secure the height adjustment.

A padded foot 33 consisting of a rigid backing 34 and a resilient pad 36 serve two functions. First, to distribute the weight of the kayak or article being loaded over a large surface area of the vehicle's roof panel. Second, to prevent the vehicle's paint finish from being scratched.

Figure 5:
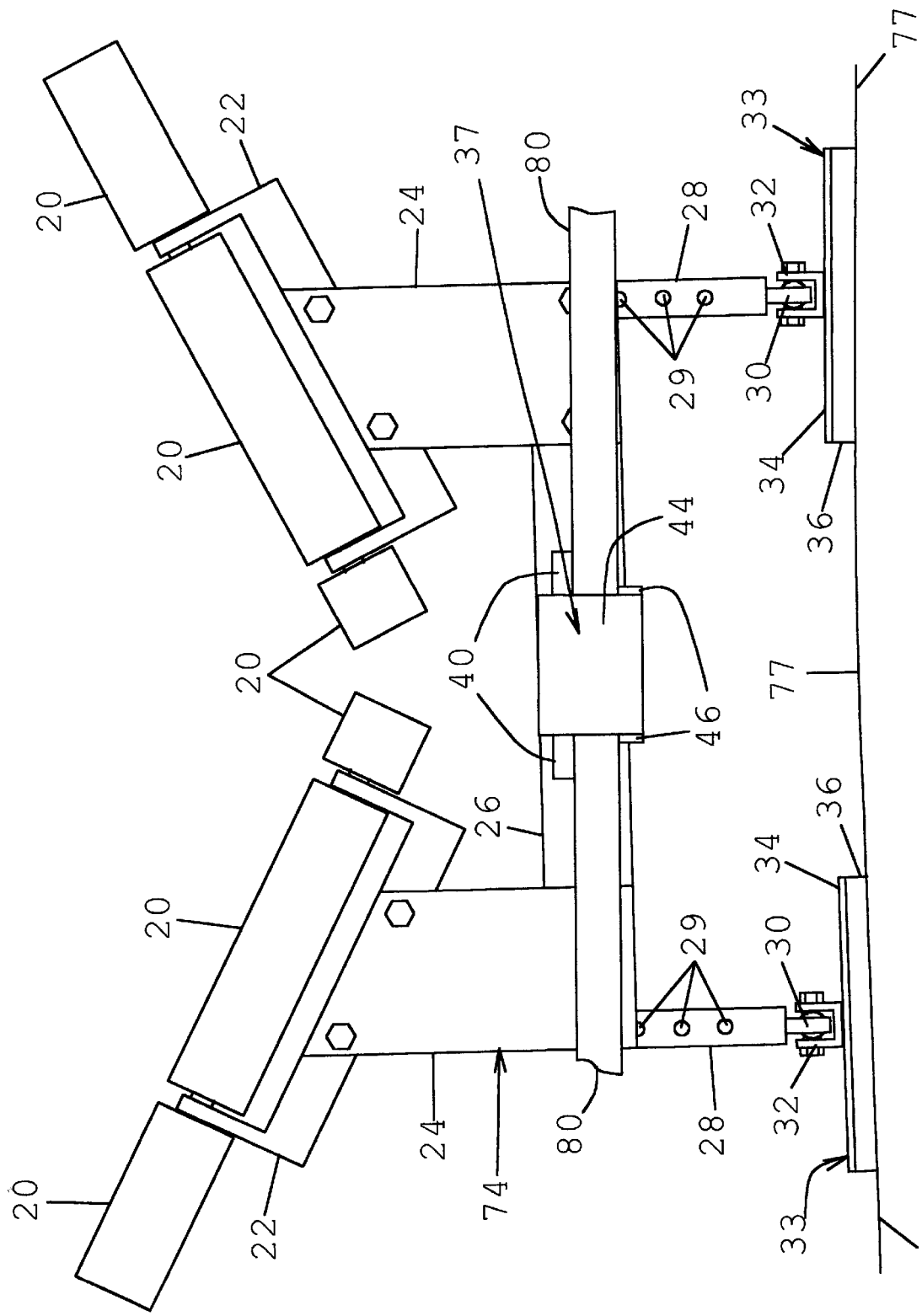
FIG. 5 is a front view showing the invention latched to a section of a rear roof rack crossbar with the padded feet resting on the roof panel.

Attached to the upper surface of rigid backing 34 of each padded foot 33 and extending upwards is a "U" shaped transition bracket 32. Transition bracket 32 connects padded foot 33 to a rod end 30 threaded into the end of stanchion 28. Rod end 30 allows each padded foot 33 to comply to the curvature of a vehicle roof panel 77 when installed as shown in FIG. 5. The compliance of the padded foot 33 assembly to a vehicle roof panel 77 reduces the risk of damaging a vehicle's roof panel.

Extending forward from the center of and perpendicular to crossmember 26 is an attachment mechanism 37 comprising several components. An extension socket 38 is secured to crossmember 26 by a pivot pin 70 shown in FIG. 3. The degree to which attachment mechanism 37 is allowed to pivot is limited by a limit pin 72 pressed into crossmember 26. This arrangement permits attachment mechanism 37 to rotate several degrees (FIG. 5) allowing both padded foot 33 assemblies to rest uniformly on vehicle roof panel 77 while loading device 74 is attached to a rear roof rack crossbar 80. Attachment mechanism 37 can rotate equally in a counterclockwise direction also.

Refering to FIG. 1, a latch release handle 40 slides freely within a latch release handle slot 41 at the rear most end of extension socket 38. Fitting within and extending forward along the longitudinal axis of extension socket 38 is a length adjusting section 42. Several evenly spaced through holes 43 located along both sides of length adjusting section 42 provide adjustment of the attachment mechanism 37. Length adjustment is accomplished by removal of a through bolt 39 and sliding length adjusting section 42 inward or outward of extension socket 38 to the desired length. Through bolt 39 is re-inserted and tightened to secure the adjustment.

Permanently attached to the forward end of length adjusting section 42 is a latch housing 44 supporting several components. Permanently attached to each side of latch housing 44 is a latch plate guide 46. Both latch plate guides 46 retain a latch plate 48 which slides within latch plate guides 46 along the longitudinal axis of latch housing 44. A forward latch support 50 is permanently attached to the lower front edge of latch housing 44. Latch plate 48 slides into the space between latch housing 44 and forward latch support 50. A crossbar relief 52 passes through latch housing 44 perpendicular to the longitudinal axis of the latch housing 44.

A sectional view of the internal components of latch mechanism 37 is shown in FIG. 3. Passing through and fixed to latch release handle 40 is a cable 54 extending forward and attaching to the end of a latch plate actuating rod 56. Force applied to latch release handle 40 is transfered through cable 54 to latch plate actuating rod 56. Latch plate actuating rod 56 slips through, with minimal resistance, a latch plate actuating rod guide 58 permanently attached to the upper interior wall of length adjusting section 42. A compression spring 60 fits loosely over latch plate actuating rod 56 and seats against latch plate actuating rod guide 58. The opposite end of compression spring 60 is retained by a pin 62 pressed into latch plate actuating rod 56. Compression spring 60 continuously forces latch plate actuating rod 56 forward.

The vertical segment of latch plate actuating rod 56 passes through a latch plate actuating rod slot 57 in the bottom of latch housing 44 and through a hole in latch plate 48. A thrust pin 64 oriented perpendicular to the longitudinal axis of latch plate actuating rod slot 57 and extending beyond the perimeter of latch plate actuating rod slot 57 is pressed into latch plate actuating rod 56. Thrust pin 64 limits downward thrust of latch plate actuating rod 56 as latch release handle 40 is released.

Passing through latch plate actuating rod 56 below latch plate 48 is a cotter pin 66. Cotter pin 66 serves to limit upward vertical thrust of latch plate actuating rod 56 as compression spring 60 returns latch plate actuating rod 56 and latch plate 48 to the closed position.

PREFERRED EMBODIMENT—OPERATION

Operation of the invention is simple and straightforward. However, the loading device must be installed prior to loading a kayak. Installation of the loading device is quick and can be performed with one hand. FIGS. 6 through 11 accompany the following description of installing the loading device 74 on a vehicle 76 prior to loading a kayak.

Figure 7:
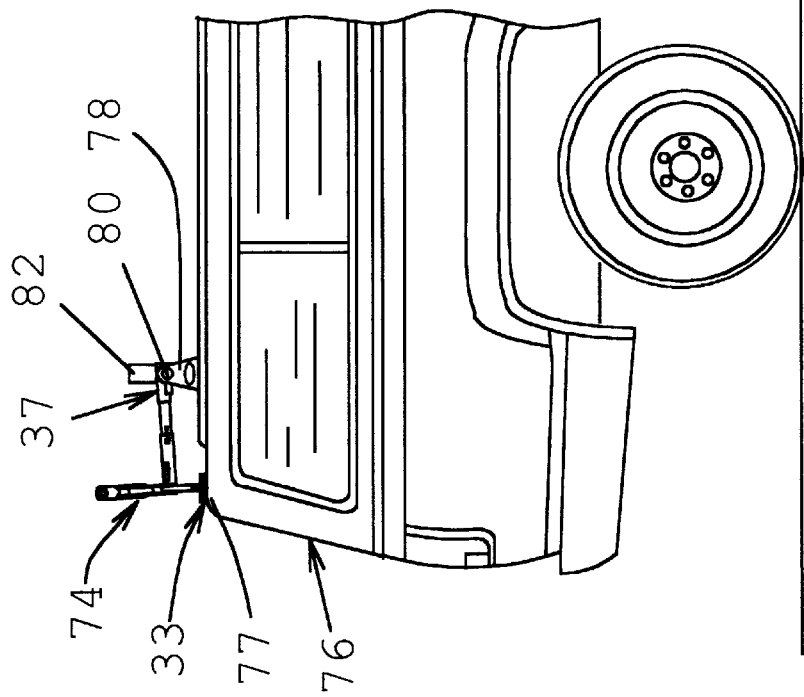
FIG. 7 shows the loading device resting on a vehicle's roof prior to latching onto a rear roof rack crossbar.
Figure 6:
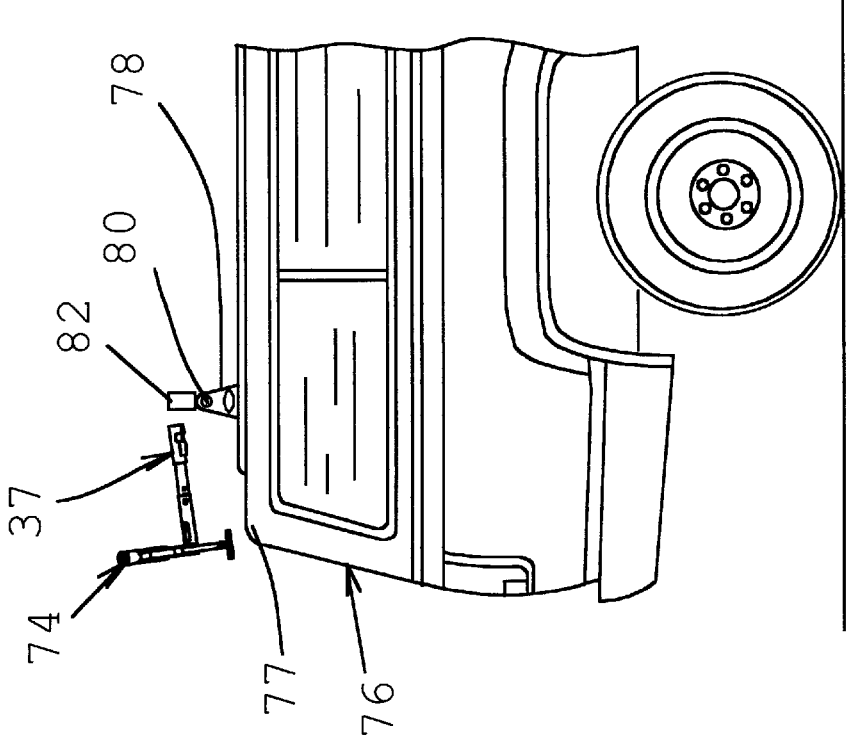
FIG. 6 shows the loading device being installed onto the rear edge of a vehicle's roof and rear roof rack crossbar.
Figure 11:
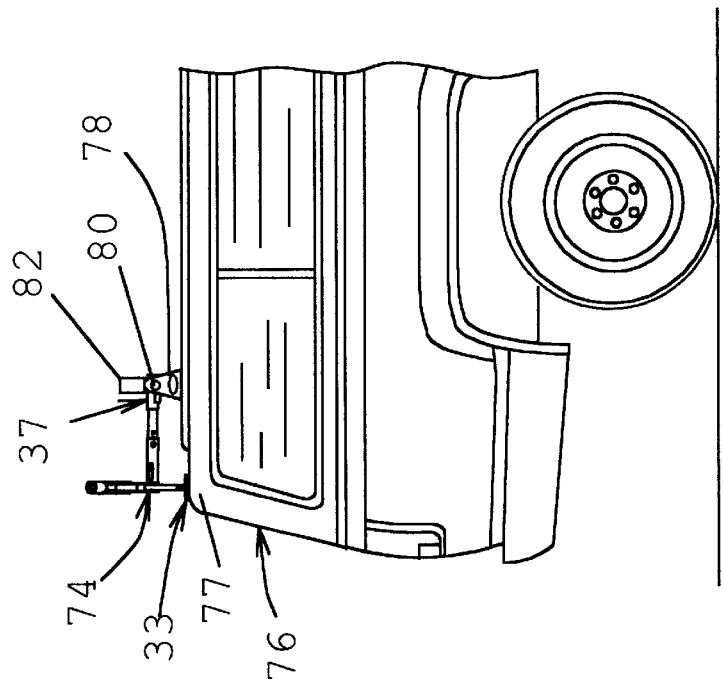
FIG. 11 is a side view of the loading device fully installed on a vehicle.

Refering to FIGS. 6 and 7, loading device 74 is oriented so latch plate 48 of the attachment mechanism 37 rests directly on rear roof rack crossbar 80. The length of attachment mechanism 37 must be adjusted accordingly to assure that padded feet 33 will rest at the rear most edge of vehicle roof panel 77. The rear edge of vehicle roof panel 77 is rigid in this region and is capable of supporting the full weight of a kayak.

Figure 8:
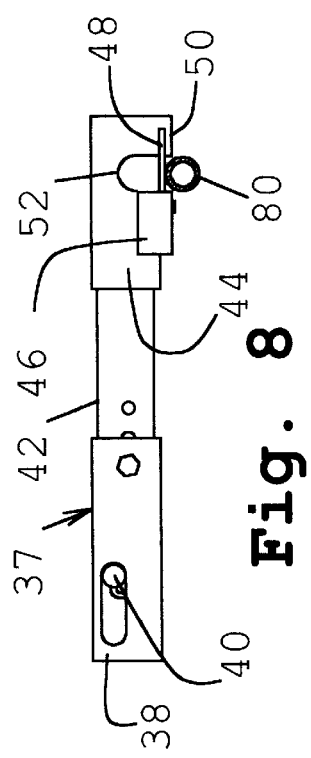
FIG. 8 is a side view showing only the attachment mechanism resting on a rear roof rack crossbar prior to latching onto the crossbar.
Figure 9:
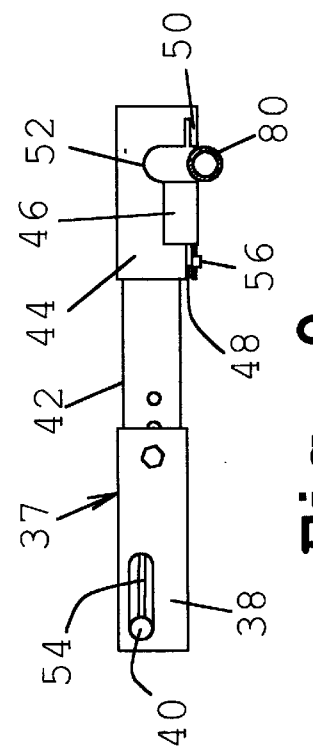
FIG. 9 shows the attachment mechanism in the fully open position allowing the device to engage a rear roof rack crossbar.
Figure 10:
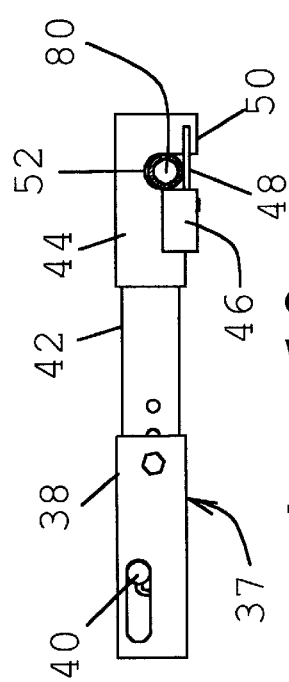
FIG. 10 shows the attachment mechanism latched onto a roof rack crossbar.

The loading device 74 must be secured to vehicle 76 after it has been properly positioned on vehicle roof 77 and rear roof rack crossbar 80. FIGS. 8, 9 and 10 show the latching procedure required to attach and stabilize loading device 74. As previously stated, it is absolutely neccessary to position attachment mechanism 37 so that latch plate 48 rests directly on rear roof rack crossbar 80 as shown in FIG. 8.

Latch release handle 40 is pulled (FIG. 9) which acts on cable 54 and latch plate actuating rod 56 retracting latch plate 48 along latch plate guides 46. Crossbar relief 52 is exposed to rear roof rack crossbar 80 as latch plate 48 is retracted. Latch housing 44 engages rear roof rack crossbar 80 once crossbar relief 52 is fully exposed. Latch release handle 40 is released once the latch housing 44 has fully engaged rear roof rack crossbar 80. Compression spring 60 pushes latch plate actuating rod 56 forward returning latch plate 48 to the closed position (FIG. 10). In addition, compression spring 60 pulls cable 54 and latch release handle 40 back to their original position. The invention is now secured to the rear roof rack crossbar 80 (FIG. 11) and ready to aid a person to load a kayak.

Figure 12:
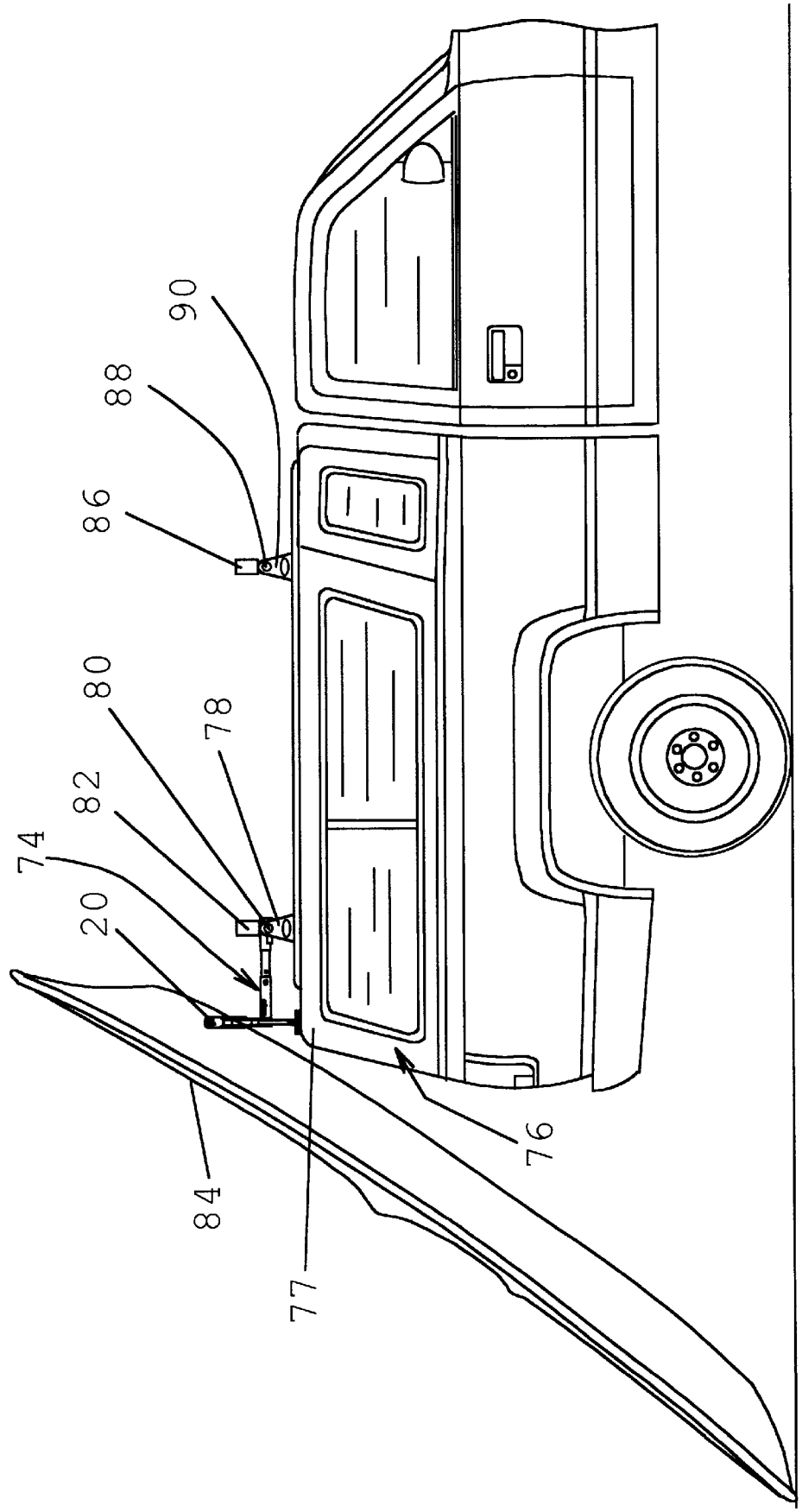
FIG. 12 is a side view of the loading device installed on a vehicle with a kayak resting in the vertex of the rollers.
Figure 13:
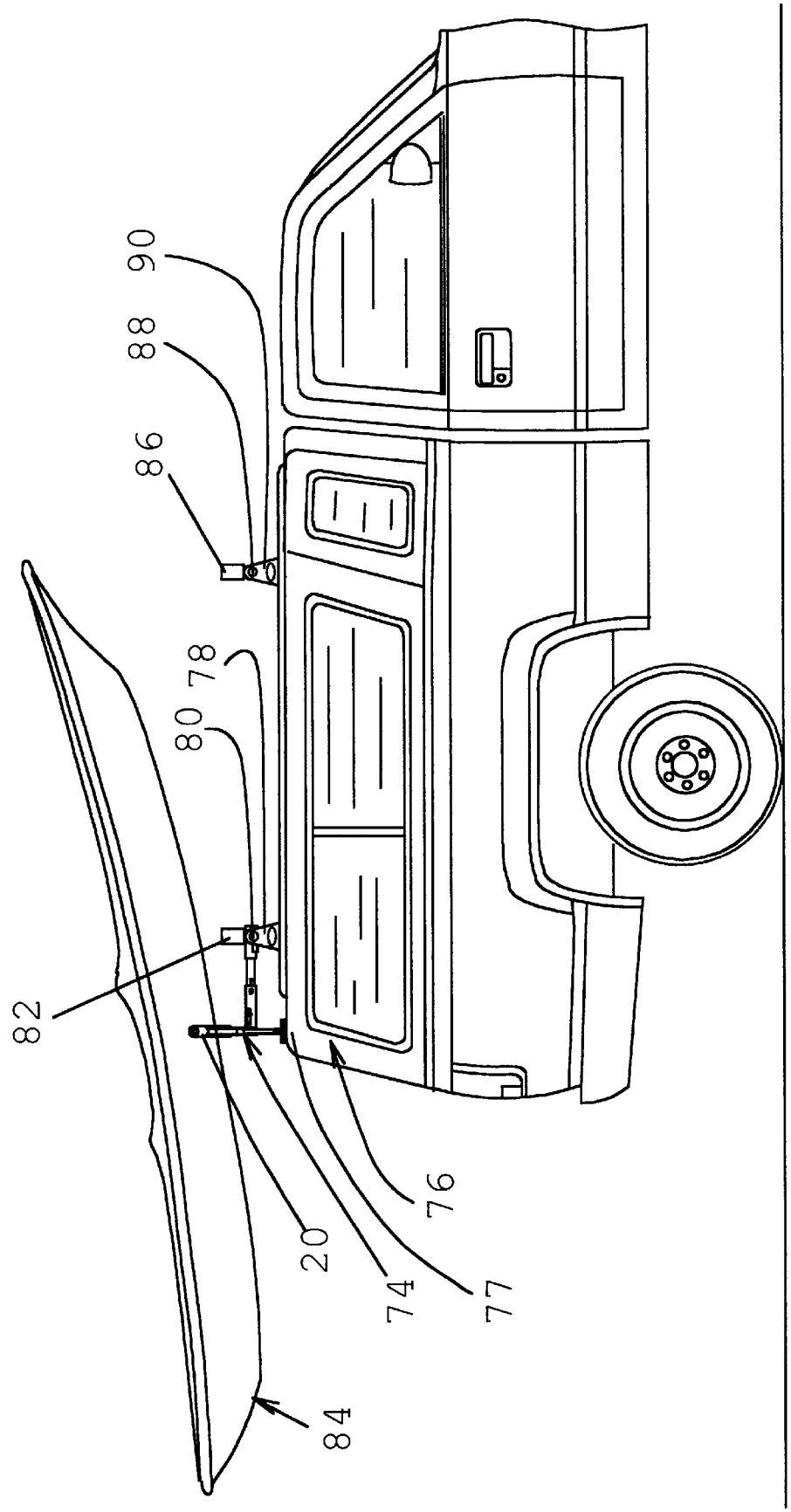
FIG. 13 shows a kayak being pushed along the rollers of the loading device onto the roof rack cradles of a vehicle.

FIGS. 12 through 15 show the loading device 74 used to load a typical kayak 84. Following the installation of loading device 74, the bow of a kayak 84 is placed in the vertex of rollers 20 as shown in FIG. 12. Kayak 84 is then pushed upward and forward on rollers 20. The "V" configuration of rollers 20 maintains kayak 84 in an upright attitude and prevents translation of kayak 84 during the loading proceedure.

Figure 14:
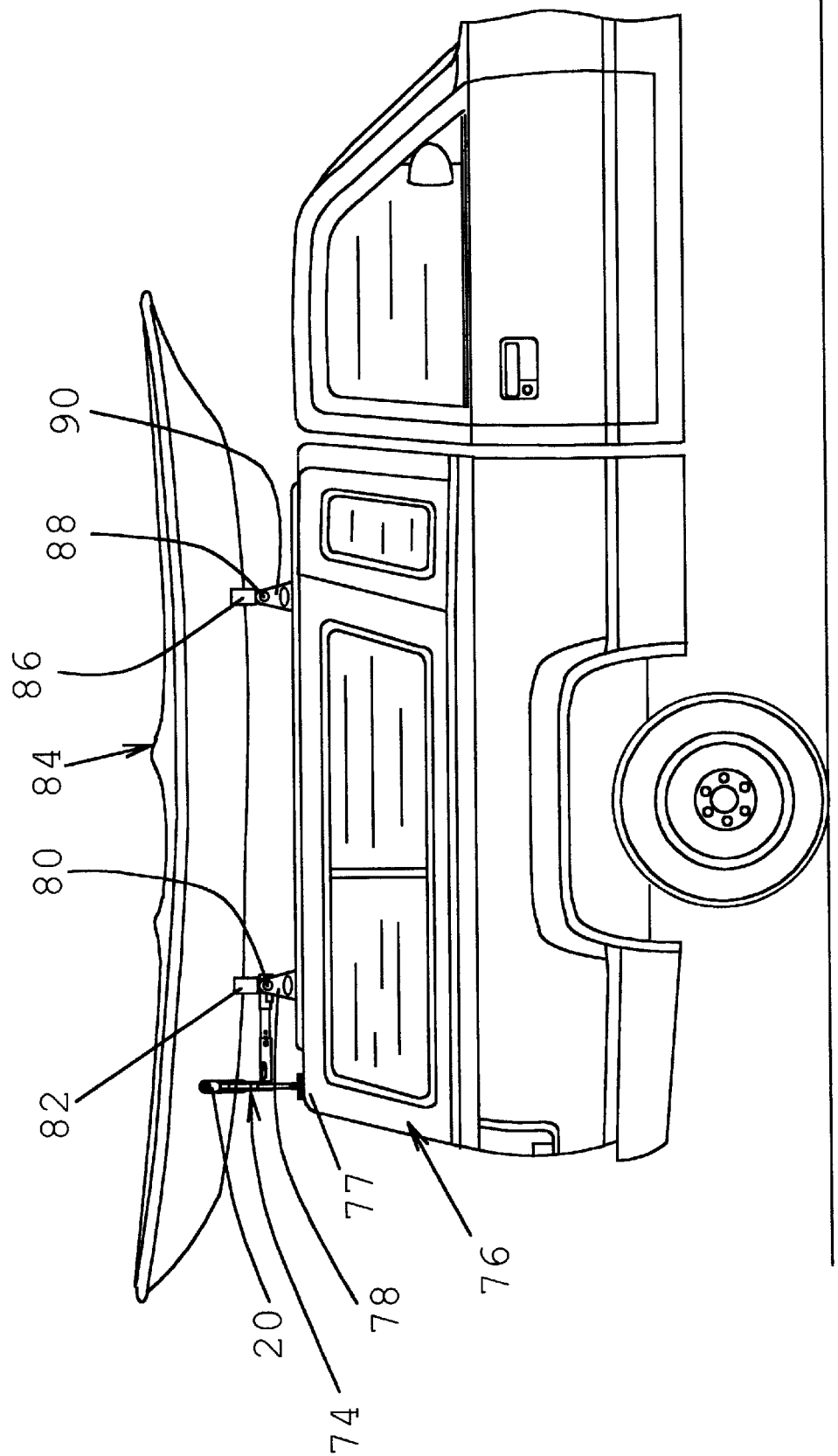
FIG. 14 shows a kayak fully positioned onto the roof rack cradles of a vehicle prior to removal of the loading device.
Figure 15:
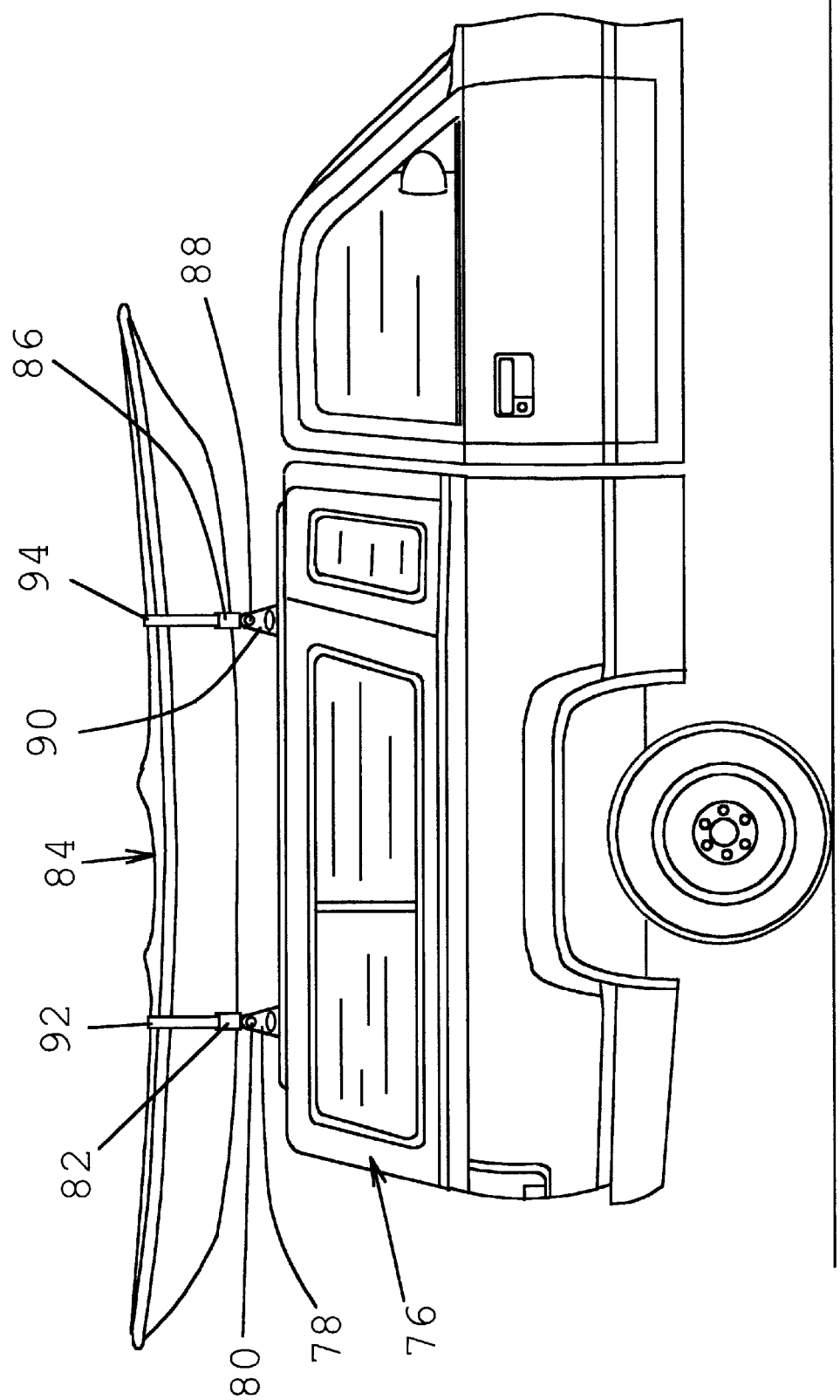
FIG. 15 shows the loading device removed from a vehicle and a kayak strapped into the roof rack cradles.

As kayak 84 continues to be pushed along rollers 20, it will aquire a horizontal attitude (FIG. 13) as the center of gravity of kayak 84 approaches the vertical centerline of rollers 20. The bow of kayak 84 decends onto front cradles 86 as kayak 84 is maneuvered even further forward eventually coming to rest as shown in FIG. 14.

The loading device 74 can be removed once kayak 84 is positioned as far forward as neccessary. To remove loading device 74, the stern of kayak 84 is raised from rollers 20 only high enough to remove the weight of kayak 84 from loading device 74. Latch release handle 40 is pulled to retract latch plate 48 while grasping loading device 74. The loading device 74 is lifted clear of rear roof rack crossbar 80 and removed from underneath kayak 84. Kayak 84 is lowered into rear cradle 82 once loading device 74 has been removed. Kayak 84 is then strapped into front and rear cradles, 86 and 82 respectively, with straps 92 and 94.

Conclusions, Ramifications, and Scope

Accordingly, it can be seen that according to the invention, I have provided a kayak loading device that will easily allow a single person to load a kayak or similar article onto the roof rack of a motor vehicle, that is lightweight, can be installed with minimal expenditure of time, can easliy be employed with roof rack mounted cradles, can maintain a kayak in an upright position and guide it during loading and can be employed without the need of additional components or hardware installed or mounted to either the vehicle or kayak.

Although the description above contains many specificities, these should not be construed as limiting the scope of the invention but as merely providing illustrations of some of the presently preferred embodiments of this invention. Various other embodiments and ramifications are possible within it's scope. For example, roller supports 22 can be permitted to freely pivot through a limited angle allowing rollers 20 to more closely follow the cross sectional profile of a kayak's hull as it is loaded. Roller supports 22 and roller struts 24 can be modified to allow rollers 20 to be repositioned and locked in a coaxial arrangment for loading flat articles. Roller struts 24 can be fabricated in such a manner as to position rollers 20 even further rearward of a vehicle's roof. The profile of the crossbar relief can be varied to accomodate roof rack crossbars of square and elliptical cross section.

Thus the scope of the invention should be determined by the appended claims and their legal equivalents, rather than by the examples given.

What is claimed is:

1. A loading device enabling a person to load a kayak or similar article on to the roof rack carrier of a vehicle, the device comprising:

a plurality of rollers mounted rotatably in a plurality of supports, a crossmember, a plurality of struts, said plurality of struts attached to and extending upwardly from said crossmember, said plurality of freely rotating rollers mounted to said plurality of supports attached to said plurality of struts in such a manner as to orient said freely rotating rollers in a "V" configuration, a plurality of adjustably movable stanchions, said plurality of adjustably movable stancions attached to and extending downwardly from said crossmember, a padded foot attached by a flexible means to the distal end of each said adjustably movable stanchion, an attachment mechanism extending laterally from said crossmember, said attachment mechanism comprising:

an extension socket, a means of pivotably attaching said extension socket to said crossmember and, a means of limiting the degree of rotation of said extension socket, a latch release handle slidably mounted in said extension socket, a length adjusting section attached to, and adjustably movable within said extension socket, a latch housing permanently attached to the distal end of said length adjusting section, a crossbar relief suitable to engage a section of tubing in the distal end of said latch housing, a plurality of latch plate guides opposing each other and permanently attached to the lower most portion of the vertical surfaces of the proximal end of said latch housing and positioned so as to not extend beyond the perimeter of said crossbar relief, a latch plate slidably retained between said latch plate guides on the lower most horizontal surface of said latch housing, Said latch plate allowed to slide over said crossbar relief so as to entrap said section of tubing within said latch relief, a latch plate support permanently attached to the distal end of said latch housing, projecting horizontally towards the proximal end of said latch housing, not to extend beyond the perimeter of said crossbar relief and creating a cavity in which said latch plate can pass within, a latch plate actuator rod forming a right angle having a horizontal segment and a vertical segment, a latch plate actuator rod guide permanently attached to an interior wall of said length adjusting section, said latch plate actuator rod guide having a hole larger in diameter then the diameter of said horizontal segment of said latch plate actuator rod permuting said latch plate actuator rod to slide within said latch plate actuator rod guide, a compression spring slidably positioned on the said horizontal segment of said latch plate actuator rod, and said latch plate actuator rod horizontal segment inserted through said hole in said latch plate actuator rod guide so as to permit one end of said compression spring to contact said latch plate actuator rod guide, a pin perpendicular to the longitudinal axis of said latch plate actuator rod horizontal segment, said pin retained in said latch plate actuator rod by interference means, and positioned near the intersection of horizontal and vertical segments of said latch plate actuator rod, said pin contacting said compression spring, a cable, proximal end of said cable connected to and extending from the end of said latch plate actuator rod horizontal segment, distal end of said cable adjustably connected to said latch release handle, said latch plate actuator rod vertical segment extending beyond the lower horizontal surface of said latch housing through a slot, the width of said slot being greater than the diameter of said latch plate actuator rod vertical segment allowing said latch plate actuator rod to slidably move within said slot, and the length of said slot being equal to or greater than the width of said crossbar relief in said latch housing, a hole in said latch plate corresponding to said slot in said latch housing, said latch plate actuator rod vertical segment freely passing through said hole in said latch plate, a thrust pin fixed in said latch plate actuator rod vertical segment perpendicular to the longitudinal axis of said slot in said latch housing and extending beyond the perimeter of said slot, a cotter pin at the distal end of said latch plate actuator rod vertical segment and retaining said latch plate actuator rod to said latch plate.

2. The loading device of claim 1 wherein said crossbar relief will engage a section of tubing having a circular crossection.

3. The loader device of claim 1 wherein said crossbar relief will engage a section of tubing having a rectangular crossection.

4. The loading device of claim 1 wherein said crossbar relief will engage a section of tubing having an eliptical crossection.

* * * * *